United States Patent Office 3,792,012
Patented Feb. 12, 1974

3,792,012
SILICONE RESIN USEFUL IN MOLDING
COMPOSITIONS
Joseph J. Zdaniewski, Scotia, N.Y., assignor to
General Electric Company
No Drawing. Filed Mar. 17, 1972, Ser. No. 235,580
Int. Cl. C08g 51/04
U.S. Cl. 260—37 SB          26 Claims

ABSTRACT OF THE DISCLOSURE

A silicone resin composition having improved flexural strength and thermal shock properties comprising a resinous terpolymer compound having $RSiO_{3/2}$ units, $R_2SiO$ units and

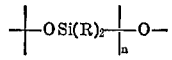

units where the R to Si ratio is 1.05 to 1.99. The R radical represents monovalent hydrocarbon radicals, halogenated monovalent hydrocarbon radicals where the R radicals in a particular unit are different which resin contains a total alkoxy and silanol content from 2% to 8% by weight and wherein the R radical in each unit has at least 10 mole percent aryl radicals.

A silicone molding composition may be prepared containing 5 to 100% of the above resin and 0 to 95% by weight of any well known silicone molding resin.

BACKGROUND OF THE INVENTION

This invention relates to novel silicone resin compositions and in particular to novel silicone resin compositions containing diorganopolysiloxane difunctional units which resins are useful in molding compositions.

Normally, electric components such as diodes, triodes, transistors, resistors and various types of electrical systems are encapsulated. In the past, well known organic compositions were used in encapsulating these systems. The reason for using such an encapsulating system is to properly insulate the electrical component and to insure that moisture does not contact the electrical component junctions and thus impair the component's efficiency. As a result, silicone resin molding compositions were developed for this purpose.

The silicone resin molding compositions were particularly advantageous for encapsulating electrical components in that they had three inherent properties as an encapsulating material as compared to the typical straight organic encapsulating materials. Thus, silicone resin molding compositions are weather and particularly moisture resistant, have excellent electric insulating properties and in addition have desirable fire retardant properties.

It was found that one of the disadvantages of silicone resin molding compositions was that they were sometimes too brittle, that is, the final molded encapsulated material or composition tended to be unduly brittle. Thus, when the electrical component and the encapsulated material were quickly heated from room temperature to an excessively high temperature such as 200° C., or were cooled from the high temperature to room temperature in a short period of time then the encapsulating part would craze or crack, thus, destroying the necessary insulative properties of the encapsulant.

Various methods were tried to improve the thermal shock resistance of such silicone resin molding encapsulating materials. One method was to add large amounts of the normal process aid that is to be found in such silicone resin molding compositions. However, it was found that even with large amounts of process aid or even with the presence of normal silicone fluids which are plasticizers and lubricants in other compositions that such additives did not materially improve the thermal shock resistance of the resulting silicone resin molding composition.

Various silicone resin to filler ratios were also experimented with. However, no improvement was obtained with such developments. In addition, the formulation of the basic silicone binder resin was varied, that is, the R to Si ratio was varied with only slight improvement in thermal shock resistant properties.

In addition, it was desired to impart to the silicone resin molding composition superior flexural strength, that is, the ability of the encapsulant or cured silicone resin molding composition to take a sharp blow without breaking. Thus, it was desired to make a silicone resin molding composition that was less brittle than prior art silicone resin molding compositions.

The addition of the known plasticizers and other experimental methods did not improve the flexural strength or the toughness of the resulting cured silicone resin molding composition any more than it improved the thermal shock resistance.

One of the disadvantages of the well known plasticizers or process aids is that when added to the well known silicone resin molding compositions, such plasticizers were incompatible with the resin and as such would separate out from the resin when the resin was cured and not impart the necessary plasticizing and flexural strength to the resulting cured silicone resin molding composition. Accordingly, it was desired that a resin be developed which would be less brittle and had more flexural strength than the silicone resins of the past. In addition, it was desired to develop a silicone resin which could be used in molding compositions to produce silicone resin encapsulants with superior moisture resistance.

It was also desirable to develop a silicone resin which in the uncured state and when mixed with the other ingredients of a silicone resin molding composition would have the proper viscosity as a melt so that it could flow with sufficient fluidity to fill all the spaces in an intricately shaped mold. In the past, these desirable flow properties resulted by the incorporation into the resin of various kinds as well as excessive amounts of filler such as, silica filler and particularly disilazines treated fumed silica filler. However, it was desirable to develop a silicone resin which would impart to the resulting molding composition melt the necessary and requisite flow properties.

Thus, it is one object of the present invention to provide a novel silicone resin having superior flexural strength, toughness, moisture resistance and thermal shock resistance.

It is another object of the present invention to provide a process for producing a novel silicone resin having improved thermal shock resistance, improved moisture resistance, and improved flexural strength or toughness.

It is an additional object of the present invention to provide a novel silicone resin which can be used to form a silicone resin molding composition which when cured will result in a molded product having improved thermal shock resistance and moisture resistance.

It is yet another object of the present invention to provide a novel silicone resin which can be incorporated into a molding composition so as to provide a superior molding composition which does not necessitate the use of special fillers to control the flow properties or viscosity properties of the silicone resin molding composition melt.

It is still another object of the present invention to provide a novel silicone resin composition which may be incorporated in silicone resin molding compositions which novel silicone resin does not necessitate the use of a proccess aid in such molding composition so as to facilitate the mixing of the filler with the silicone resin.

These and other objects of the present invention are accomplished by means of the invention defined below.

SUMMARY OF THE INVENTION

In accordance with the above objects, there is defined by the present invention a silicone resin molding composition having improved flexural strength, thermal shock resistance and moisture resistance comprising a resinous terpolymer compound of $RSiO_{3/2}$ trifunctional units, $R_2SiO$ difunctional units and

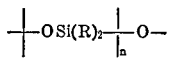

difunctional fluid units, where the R to Si ratio is from 1.05 to 1.99, the mole ratio of the trifunctional units to the difunctional units may vary from 90:1 to 2:1 and the mole ratio of the trifunctional units to the difunctional fluid units may vary from 18:1 to 67:1 and the total alkoxy and silanol content of the resin may vary from 2% to 8% by weight where R is selected from the class consisting of lower alkyl radicals of 1 to 8 carbon atoms, cycloalkyl radicals of 5 to 7 carbon atoms, lower alkenyl radicals of 2 to 8 carbon atoms, mononuclear aryl radicals, mononuclear aryl lower alkyl radicals where the alkyl group has from 1 to 6 carbon atoms, and halogenated derivatives of the above radicals where the R radicals in each unit may represent different radicals in the same unit, where at least 10 mole percent of the R radicals in the trifunctional units and the difunctional units are aryl radicals and in which at least 12 mole percent of the total quantity of trifunctional units are substituted solely by lower alkyl radicals and $n$ varies from 5 to 1000.

Such a resin is produced by adding a mixture of organohalosilanes of the formula $R_aSiX_{4-a}$ to a mixture of water, acetone, water-immiscible solvent, and a silanol-stopped diorganopolysiloxane having a viscosity of 1 to 100,000 centipoises at 25° C., where the R radicals and the organo radicals of the diorganopolysiloxane are the same and are defined as set forth previously, agitating the resulting mixture, separating the organic layer from the water layer, washing the organic layer with water until it is neutral, filtering the organic layer, stripping off the solvent from the organic layer at a temperature in excess of 100° C., to leave a resinous material, casting the resinous material at 100% solids, and then grinding the cast resin material to a fine powder. It should be mentioned that this silicone resin of the present invention which is ground to a fine powder is a non-agglomerate type of powder and can be stored for large periods of time without setting up in the storage container.

The above novel silicone resin may be used at a concentration of 5 to 100% by weight of the total resin present in the molding composition and is preferably used at a concentration of 10 to 50% by weight of the total resin present in a molding composition. The other type of resin that may be present in a molding composition may be any of the well known high silanol content silicone resins used in molding compositions.

The silicone resin of the present composition may be used to form a molding composition by mixing it with the proper amount of filler, a catalyst system, release agents, pigments and other desired additives. Although a process aid may be used for this novel silicone resin in forming a silicone resin molding composition, it is not necessary because of the plasticizing properties of the silicone resin of the present invention. This novel silicone resin will impart to a silicone resin molding composition improved flexural strength, thermal shock resistance, and moisture resistance. The advantage of this silicone resin is that its placticizing properties are part of the resin. Thus, it does not necessitate or require the addition of additives to the molding composition so as to plasticize the molding composition sufficiently to improve its thermal shock resistance or flexural strength. In the case when additives are used and particularly additives which are incompatible with the basic silicone resin in the composition, such additives may leach out or separate out. In the present case, since the plasticizing additive or property is part of the basic silicone resin by the use of the silicone resin of the present invention, the molding composition has inherently the properties of improved flexural strength, improved moisture resistance and improved thermal shock resistance.

DESCRIPTION OF THE PREFERRED EMBODIMENT

The R radical in the trifunctional, difunctional and fluid difunctional units is preferably selected from lower alkyl radicals, e.g., methyl, ethyl, propyl, butyl, amyl, hexyl, and octyl radicals; cycloalkyl radicals having 5 to 7 carbon atoms in the ring, e.g., cyclopentyl, cyclohexyl and cycloheptyl radicals; lower alkenyl radicals, e.g., vinyl and allyl radicals; mononuclear aryl radicals, e.g., phenyl, tolyl and xylyl radicals; mononuclear aryl lower alkyl radicals, e.g., benzyl and phenylethyl radicals and halogenated derivatives of the above radicals, e.g., chloromethyl, beta-chloroethyl, chlorophenyl, dibromophenyl and trifluoromethylethyl radicals.

All the R radicals in a particular silicone resin in a particular unit may not be the same but are preferably a mixture of different types of radicals such as, alkyl and aryl and the different types of aryl radicals. Thus, in a trifunctional unit in a particular silicone resin there may be both alkyl, cycloalkyl, alkenyl and aryl radicals. This is also true of the difunctional units and the fluid difunctional units. In addition, although the preferred radicals for the difunctional fluid units are the ones defined above, it is also true that other types of radicals may be represented by the R radicals in the difunctional fluid units such as, cyano lower alkyl radicals, e.g., cyanoethyl, cyanopropyl radicals.

In the novel silicone resin composition of the present case, it is preferred that at least 10 mole percent of the R radicals in the trifunctional units, difunctional units and fluid difunctional units be an aryl radical such as, phenyl. Preferably, the R radicals are selected from methyl and phenyl.

In addition, it is a requirement of this novel silicone resin composition of the present invention that at least 12 mole percent of the R radicals in the trifunctional units in the final resin be a lower alkyl radical such as, methyl. It is desired to have this quantity of lower alkyl radicals and preferably methyl in order to give the proper tensile strength to the final resin. This 12 mole percent must be interpreted as 12 mole percent of the total resin composition, that is, 12 mole percent of the total resin composition must be lower alkyl trifunctional units such as, $(CH_3)SiO_{3/2}$ units.

The preferred R to Si ratio is from 1.2 to 1.6. This more preferred range of R to Si results in a silicone resin that has the proper tensile strength as well as the proper plasticizing properties to impart to a molding composition improved flexural strength and thermal shock resistance.

The preferred mole ratio of the trifunctional units to the difunctional units is from 18:1 to 2:1 and the preferred ratio of the trifunctional units to the fluid difunctional units is from 9:1 to 1:1. These preferred ratios of R to Si as well as the ratios of the trifunctional unit to the difunctional unit and to the fluid difunctional unit results in a silicone resin which imparts to a molding composition the best combination of the tensile strength with flexural strength, moisture resistance and thermal shock resistance.

The novel silicone resin of the composition is produced by mixing a mixture of organohalosilanes of the formula $R_aSiX_{4-a}$, where R represents a mixture of different radicals as defined previously, X defines halogen and $a$ is a whole number that varies from 1 to 2, which mixture of organohalosilanes is mixed with water, acetone, a water-immiscible solvent and a silanol-stopped diorganopolysiloxane having a viscosity of 1 to 100,000 centipoises at 25° C., where the organo radicals of the polysiloxane include the radicals defined for R as defined previously, that is, a monovalent hydrocarbon radical, halogenated monovalent hydrocarbon radical or a cyanolower alkyl radical.

The resulting mixture is agitated and the organic layer separated from the water layer. The organic layer is then washed with the water until all the acid is removed and it is neutral. The organic layer may optionally be filtered to remove any additional acid, then the solvent is stripped from the organic layer at a temperature in excess of 100° C. and the molten resin is cast into a sheet at 100% solids. The resulting sheet when it cools down is ground into powder which is non-agglomerating.

The diorganopolysiloxane that is used in the mixture preferably has the formula,

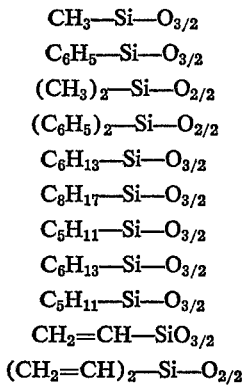

where R and $n$ is as previously defined.

The type of organohalosilanes are present in the proportions that it is desired they appear in the final cured resin. There is preferably present per mole of the silanol-stopped diorganopolysiloxanes 19 moles to .67 mole of the organohalogensilanes depending on the final ratio desired of the trifunctional and difunctional units to the fluid difunctional units.

Examples of siloxane units which can be present in the novel silicone resins of the present invention are:

$$CH_3—Si—O_{3/2}$$
$$C_6H_5—Si—O_{3/2}$$
$$(CH_3)_2—Si—O_{2/2}$$
$$(C_6H_5)_2—Si—O_{2/2}$$
$$C_6H_{13}—Si—O_{3/2}$$
$$C_8H_{17}—Si—O_{3/2}$$
$$C_5H_{11}—Si—O_{3/2}$$
$$C_6H_{13}—Si—O_{3/2}$$
$$C_5H_{11}—Si—O_{3/2}$$
$$CH_2=CH—SiO_{3/2}$$
$$(CH_2=CH)_2—Si—O_{2/2}$$

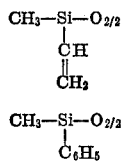

As mentioned previously, it is preferred that the silicone resin of the present invention have at least 10 mole percent and preferably at least 50 mole percent of the R radicals in the trifunctional units, difunctional units and fluid difunctional units as aryl radicals such as, phenyl radicals to impart desired flame retardancy, high temperature resistance and additional flexural strength to the molding composition.

In addition, the silicone resin of the present case has a total alkoxy and silanol content that may vary from 2% to 8% by weight of the total silicone resin. Preferably, the silicone resin of the present invention has a total silanol content of at least 2% by weight and a total alkoxy and silanol content of at least 3% by weight.

In the hydrolysis procedure of the organohalosilanes and the silanol-stopped diorganopolysiloxane to produce a novel silicone resin of the present invention, there is preferably used 1.7 to 10 parts of water per part of organohalosilanes, 0.2 to 5 parts of acetone per part of the organohalosilanes, and 0.3 to 5 parts of water-immiscible organic solvent per part of the organohalosilanes. In addition to the other ingredients, there may preferably be used in the hydrolysis procedure an aliphatic monohydric alcohol of the formula,

R'OH where R is selected from alkyl radicals of from 1 to 15 carbon atoms, or there may be used in combination with the organohalosilanes an alkoxylated organosilane of the formula, $$(R^2)_a(R'O)_bSiX_{4-a-b}$$

where $R^2$ is selected from the same class as R and R' as defined previously, X is halogen and $a$ is a whole number that varies from 1 to 2, $b$ is an integer that is equal to 1 to 3, inclusive and the sum of $a+b$ is equal to 2 to 4, inclusive. These latter two compounds are added to the basic silane, that is, the alcohol, or the alkoxylated halogen silane are added to the organohalosilanes if it is desired to obtain a final resin composition having both silanol and alkoxy groups therein. The presence of a minor amount of alkoxy groups in the resin of the present case retards the rapidity of the cure of the resin when it is used to form a thermosetting molding composition. In some cases, at least 1 to 2% by weight of the silicone resin of alkoxy groups are preferred in order to sufficiently retard the cure of the resin in the case when the molding process is too rapid. In the case where there are no alkoxy groups in the novel silicone resin of the present invention, then the cure is very rapid and straight-forward and such a silicone resin is preferably designed for a fast, very rapid molding operation, such as, the molding of encapsulants for electric components.

When the aliphatic monohydric alcohol or the alkoxylated organosilanes of the above formulas are used in the hydrolysis procedure, there is preferably used 0 to 1 mole of such compounds per mole of the halogen attached to the organohalosilanes. Included by the organohalogensilanes of the above formulas, there are, for example, methyltrichlorosilane, dimethyldichlorosilane, methylphenyldichlorosilane, phenyltrichlorosilane, diphenyldichlorosilane, etc. Included by the partially alkoxylated organohalosilanes of the above formulas are reaction products of organohalosilanes and monohydric alcohols as defined above such as, methyl alcohol, ethyl alcohol, propyl alcohol, isopropyl alcohol, butyl alcohol, etc. In instances where the monohydric alcohol is utilized in the practice of the invention, the alcohol can be added directly to the organohalosilane before hydrolysis or it can be added to the hydrolysis mixture prior to the addition of the organosilane. As a result, the silicone resin of the present invention can be free of or contain chemically combined alkoxy radicals attached to silicon. The same is true of the addition of the silanol-stopped diorganopolysiloxane ingredient that is mixed with organohalogensilanes in the hydrolysis process of the present invention, that is, it can be either added to the water, acetone, organic immiscible solvent mixture or it can be mixed with the organohalogensilanes before such organohalogensilanes are added to the hydrolysis mixture. Preferably, the silanol-stopped diorganopolysiloxane is added to the water, acetone, organic solvent mixture prior to the addition of the organohalogensilanes so as to obtain better contact between the reactants and also to avoid excessive prior agitation of the organohalogensilanes with the silanol-stopped diorganopolysiloxane.

Preferably, a proportion of from 2 to 6 parts of water, 0.3 to 2 parts of acetone and 0.6 to 2 parts of an organic solvent is used per part of the organohalosilanes and the silanol-stopped diorganopolysiloxane. Suitable organic solvents are, for example, any water-immiscible organic solvent which is inert to the hydrolysis reaction and in which the hydrolyzate is soluble to provide for separation from the aqueous layer. For example, there can be employed a hydrocarbon such as, benzene, toluene, xylene, and etc.; esters such as, butyl acetate and ethyl acetate; ethers such as, diethyl ether, dioxane, and etc. The preferred solvents both from a solubility point and also for their inertness and non-toxicity are toluene and xylene.

During the addition, the mixture is agitated to provide for sufficient degree of hydrolysis of the organohalosilanes and the silanol-stopped diorganoolysiloxanes so as to form the silicone resin hydrolyzate. The temperature of the hydrolysis mixture can be controlled by the rate of addition and it is preferred that external heating not be used in the reaction. Preferably the hydrolysis reaction is carried out at a temperature range of 25° to 85° C. At a temperature above 85° C., the organohalogensilanes tend to be boiled off. At a temperature below 25° C., there is the formation of undesirable cyclics which result in a final silicone resin which is deficient in tensile strength.

After the addition has been completed, the mixture can be stirred for an additional period of time, such as, 30 minutes or more to allow for complete hydrolysis of the organohalosilanes. The mixture is then allowed to settle and the acid layer can be drawn off from the organic layer. The organic layer must then be washed several times so as to remove as much acid as possible and preferably to remove all the hydrochloric acid or other type of halogen acid from the hydrolyzate.

When using the silicone resin for molding resins it has been found expedient to strip under reduced pressures, such as pressure between 25 to 500 mm. mercury to a solids concentration of 50 to 70% by weight of the resin solution. At such a resin solids content the solution can be filtered or centrifuged to remove any remaining impurities in the resin and particularly to remove any remaining acid that may be still present in the silicone resin solution. Preferably, the organic phase at this time is filtered through an acid absorbant such as, Celite, fuller's earth cake to remove the last traces of acid from the solution. It is important that the total concentration of acid in the final resin be 10 parts per million or below. If the acid concentration is above this not only will such an acid concentration degrade the resulting silicone resin but it will also result in a degradation of any composition into which the silicone resin is incorporated therein such that if the silicone resin is incorporated in a molding composition and has a greater amount of acid than 10 parts per million, then the resulting molding composition will degrade over a period of time and suffer loss in tensile strength and other necessary mechanical properties, as well as in the cure rate.

At this point, the filtrate is stripped at high temperatures, say, at temperatures above 100° or 120° C. at atmospheric pressure to remove as much solvent as is desired and then the solution is vacuum stripped at a final temperature of 140° C. and above at preferably 35 mm. of vacuum or below. When all the solvent has been removed, the molten resin at 100% solids is poured or cast into a tray. The resin is cooled to room temperature as a sheet and the sheet is ground up to a fine powder which powder is preferably 10 mesh or less so that it can be easily incorporated into various types of silicone resin thermosetting compositions and preferably silicone resin molding compositions.

The silicone resins of the present invention are especially suited for incorporation at either a concentration of 100% by weight of the total silicone resin present in a silicone resin molding composition or a concentration more generally of 5 to 100% by weight of the total silicone resin present in a molding composition. There may be present in combination with the novel silicone resin of the present invention, the high silanol content resins that are presently used in forming silicone molding compositions. The presence of the silicone resin of the present case at a concentration of even as low as 5% by weight of the total silicone resin present imparts improved moisture resistance, thermal shock resistance and flexural strength. Preferably, the novel silicone resin of the present composition is used at a concentration of 10 to 50% of the total resin present and more preferably at a concentration of 30 to 50% of the total resin present.

Such a molding composition is usually formed or in a more generic sense a silicone resin thermosetting composition is formed from the combination of a resin or resins, a filler and a catalyst system. The catalyst system is preferably present at a concentration of .01 to 6% by weight of the total silicone resin present. Such a catalyst system may comprise solely a lead compound. Such a lead compound preferably being selected from the group consisting of $2PbCO_3 \cdot Pb(OH)_2$, $PbCO_3$, $Pb_2O_3$, $Pb_3O_4$, and $PbO_2$. Preferably, in the catalyst system there is present a carboxylic acid anhydride or coanhydrides in combination with the lead compound. The presence of the carboxylic acid anhydride in combination with the lead catalyst enhances the shelf life of the uncured molding composition during storage and prior to use to form a molded compound therefrom. It also enhances the reactivity of the catalyst system.

Suitable anhydrides of organic carboxylic acids useful in the catalyst system include anhydrides of saturated and unsaturated aliphatic carboxylic acids, anhydrides of aromatic carboxylic acids, anhydrides of cycloaliphatic carboxylic acids and anhydrides of substituted carboxylic acids such as, halo-substituted organo carboxylic acids. The carboxylic acids can be mono or poly carboxylic acids but, preferably, monocarboxylic acids since the monocarboxylic acids seem to provide somewhat better hot strength characteristics than do the polycarboxylic acids. In addition, it is recognized that the anhydrides suitable for the present invention can be obtained from mixtures of carboxylic acids. Such mixtures include different saturated and unsaturated aliphatic carboxylic acids, different cycloaliphatic carboxylic acids, different aromatic carboxylic acids or an aromatic carboxylic acid and an aliphatic carboxylic acid. Usually the aliphatic acids from which suitable anhydrides can be obtained contain from up to about 22 carbon atoms such as, acetic acid, citraconic acid, maleic acid, propionic acid, n-butyric acid, 2,3-dimethyl maleic acid, stearic acid, itaconic acid, succinic acid, n-decyl succinic acid and methyl succinic acid. The cycloaliphatic acids from which suitable anhydrides can be obtained generally contain 4 to 6 carbon atoms in the cycloaliphatic ring such as, cyclobutane carboxylic acid, 1,2,3,4-cyclopentanetetracarboxylic acid, 1,3 - cyclohexanedicarboxylic acid, and 4-cyclohexene-1,2-dicarboxylic acid. The aromatic acids from which suitable anhydrides can be derived can be mononuclear such as, benzoic acid, terephthalic acid, and pyromellitic acid, or polynuclear such as, 1,8-naphthalic acid.

Some examples of suitable anhydrides of carboxylic acids include acetic anhydride, pyromellitic dianhydride, benzoic anhydride, bromomaleic anhydride, and etc. The preferred anhydrides are benzoic anhydride, stearic anhydride and acetic anhydride with the most preferred being benzoic anhydride. The particular anhydride to be employed can be selected according to its decomposition temperature so that it becomes an active portion of the catalyst system at or near the desired cure temperature of the resin, and/or can be selected according to the desired cure rate.

The anhydride of the carboxylic acid should be present in the catalyst system in an amount sufficient to provide at least about 0.25 mole of the carboxylic acid anhydride per mole of the lead compound and more preferably at least about 0.35 mole of the carboxylic acid anhydride and up to as much as 3.5 moles of the carboxylic acid anhydride per mole of the lead compound. In place of the carboxylic acid anhydride there may be used the straight carboxylic acid. However, this has some disadvantages as pointed out in the copending application of Joseph John Zdaniewski, Ser. No. 167,027, filed July 28, 1971, entitled, "Curable Siloxane Resin Compositions."

Various fillers may be added to the silicone resin molding composition to increase the tensile strength of the cured molded product and as a matter of fact in most cases one or several types of fillers are added to the molding composition so as to increase the tensile strength of the final cured molded compound.

If there is used in the present composition at least 30% by weight of the total silicone resin of the present case, that is, one containing fluid difunctional units, in the proportions defined above, then a process aid is not necessary. A process aid is desirable solely for the purpose of facilitating the mixing of the filler with the resin. In the past, there have been used process aids in molding compositions to facilitate the incorporation and uniform dispersion of the filler and particularly silica types of filler in the resin. However, as pointed out previously, the silicone resin of the present case has the property of being very easily dispersable and particularly dispersable in silica fillers. As such, when there is at least present the amount of the silicone resin of the present case indicated above, a process aid is not necessary. However, a process aid can be used to facilitate to an even greater extent the mixing or dispersion of the filler in the silicone resin. Process aids have been traditionally used in the past to disperse finely divided fumed silica and precipitated silica fillers into diorganopolysiloxane gums, since such fillers because of their powdery nature are difficult to disperse into a polymer. As such, in the past a process aid was desirable to facilitate a dispersion of silica type fillers in gums. It was found that the use of such process aids was also advantageous in dispersing the silica fillers in preparing uncured silicone resin molding compositions. However, as stated above, such a process aid is not needed in the present invention when a sufficient amount of the resin of the present case is used in the uncured molding composition. In fact, when the silicone resin of the present invention comprises 60 to 100% by weight of the total silicone resin present then a process aid is preferably not used and proper mixing of the silicone resin with the silica filler is obtained without the use of such a process aid. There may be used 0.5 to 12% by weight of the total silicone resin content of a process aid. Any silane or low molecular weight polysiloxane fluid containing alkoxy or silanol groups is suitable as a process aid.

Generally speaking, silanes which can be employed as the process aid in the practice of the present invention are those falling within the scope of the formula $$R_t^3(OH)_u(OR^4)_v Si,$$

where $R^3$ is selected from the class comprising lower alkyl radicals having 1 to 8 carbon atoms; cycloalkyl radicals having 5 to 7 carbon atoms in the ring; lower alkenyl radicals having 2 to 8 carbon atoms; mononuclear aryl radicals; mononuclear aryl lower alkyl radicals having 1 to 6 carbon atoms in the alkyl group; and halogenated derivatives of the above radicals; $OR^4$ is a lower alkoxy radical containing from 1 to 8 carbon atoms per radical; $t$ has a value of 1 to 3; $u$ has a value of 0 to 3; $v$ has a value of 0 to 3; and the sum of $u+v$ has a value of 1 to 3.

Generally speaking, siloxane compounds which can be employed as an ingredient in the practice of the present invention are those falling within the scope of the formula $$R_x^5(HO)_y(OR^6)_z SiO_{\frac{4-x-y-z}{2}}$$

where $R^5$ and $(OR^6)$ are defined as $R^3$ and $(OR^4)$ respectively are defined above; $x$ has a value of 1 to 3; $y$ has a value of 0 to 2, $x$ has a value of 0 to 2, and the sum of $y+z$ has a value of 0.02 to 2. When $x$ has a value of less than 1.7, there must be at least 5% by weight of HO and $(OR^6)$ groups in the siloxane compound. It is prefer- able that $z$ have a value of 0. Examples of polysiloxanes which can be used are:

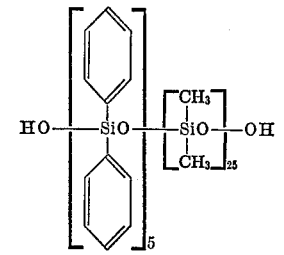

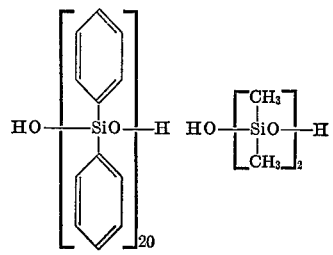

The choice of which silicon containing materials to use as a process aid depends in part on the length of storage, i.e., a more volatile material will be lost to a greater degree on storage than a less volatile material, on the degree of plasticity desired in the final cast resin, and the silanol content of the casting resin, i.e., if the silanol content of the basic silicone resins is relatively high, the silanol or alkoxy content of the polysiloxane process aid can be relatively low. It is preferred to use a silanol containing polysiloxane fluid process aid in combination with the basic silicone resins having a silanol content of over 4% since the process aid facilitates the mixing of the ingredients to form the molding composition. Other process aids that may be used in the present invention are disclosed in Martellock U.S. Pat. 3,464,945 and Konkle et al. U.S. Pat. 2,890,188. Generally, any process aid that facilitates the incorporation of a filler in a heat vulcanizable silicone rubber composition may be used in the present invention.

As stated previously, there may be present at a concentration of 0 to 95% by weight of the total silicone resin present and preferably at a concentration of 0 to 30% by weight of the total silicone resin present other types of silicone resins useful in producing silicone resin molding compositions, and preferably high silanol content silicone resin compositions which were used previously in forming molding compositions. Such prior art silicone resins which may be used in the practice of the invention are, for example, those defined in U.S. Pat. 2,646,441 of Duane, U.S. Pat. 3,135,713 of Brewer et al. and U.S. Pat. 3,389,114 of Burzynski et al. which patents are hereby incorporated into this specification by reference. The preferred prior art silicone resin that is combined with the novel silicone resin of the present invention in a molding composition is a high silanol content resin and preferably one that has a concentration of hydroxyl groups of at least 3% by weight. More preferably, the prior art resin has a silanol and alkoxy content of at least 4 weight percent and up to as much as 11 to 12% by weight of the silicone resin.

The high silanol content siloxane resins that can be used in the molding composition with the novel terpolymer silicone resin are well known materials. By the term "siloxane resin," it is meant polymers containing two or more siloxane units, and having the average unit formula, $$(OH)_q(OR^8)_r R_s^7 SiO_{\frac{4-q-r-s}{2}}$$

where $R^7$ is selected from the same class as the R radicals; $OR^8$ is selected from lower alkoxy radicals; $s$ has a value of 1.0 to 1.8 and preferably has a value of 1.05 to 1.45;

$q$ has a value of 0 to 1.0 and preferably a value of 0.2 to 0.55; $r$ has a value of 0 to 1.0 and preferably has a value of 0.2 to 0.55 and the sum of $q+r$ has a value of 0.01 to 1.0 and preferably has a value of 0.2 to 0.55.

Examples of siloxane units that can be present in the siloxane resins are

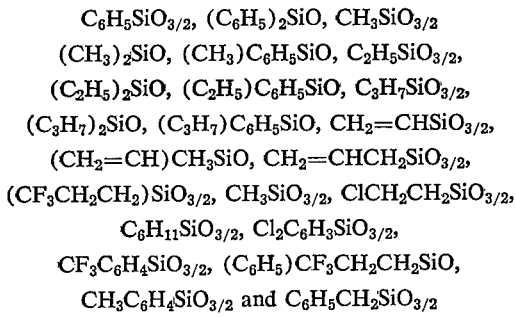

$C_6H_5SiO_{3/2}$, $(C_6H_5)_2SiO$, $CH_3SiO_{3/2}$ $(CH_3)_2SiO$, $(CH_3)C_6H_5SiO$, $C_2H_5SiO_{3/2}$, $(C_2H_5)_2SiO$, $(C_2H_5)C_6H_5SiO$, $C_3H_7SiO_{3/2}$, $(C_3H_7)_2SiO$, $(C_3H_7)C_6H_5SiO$, $CH_2=CHSiO_{3/2}$, $(CH_2=CH)CH_3SiO$, $CH_2=CHCH_2SiO_{3/2}$, $(CF_3CH_2CH_2)SiO_{3/2}$, $CH_3SiO_{3/2}$, $ClCH_2CH_2SiO_{3/2}$, $C_6H_{11}SiO_{3/2}$, $Cl_2C_6H_3SiO_{3/2}$, $CF_3C_6H_4SiO_{3/2}$, $(C_6H_5)CF_3CH_2CH_2SiO$, $CH_3C_6H_4SiO_{3/2}$ and $C_6H_5CH_2SiO_{3/2}$ The lower alkoxy radical $OR^8$ is selected from the class consisting of lower alkoxy radicals having 1 to 8 carbon atoms, e.g., methoxy, ethoxy, propoxy and isopropoxy radicals and is preferably selected from the class consisting of the above specifically named radicals.

The ratio of the organic substituents to the silicon atoms in the above-described siloxane resin must be in the range of 1.0:1 to 1.8:1. Preferably, the resin has a phenyl to silicon ratio of 0.5:1 to 0.7:1, and other substituents to silicon ratio of 1.05:1 to 1.45:1. The preferred resins of this invention are the phenylmethylsiloxane resins, i.e., resins containing siloxane units containing phenyl groups, and siloxane units containing methyl groups. The preferred resin contains some siloxane units having two monovalent hydrocarbon substituents per siloxane unit as this adds flexibility to the cured resin. Preferably, from 5 to 45% of the siloxane units contain two monovalent hydrocarbon substituents per siloxane unit.

In addition, the resin must contain at least 4.0% by weight of silicon-bonded OH and/or $(OR^8)$ groups. The resin can contain a much higher percentage of OH groups and preferably contains at least 5 weight percent of OH group, although it need have only 4% by weight of hydroxyl groups. It is preferable that 90% of the total OH and $(OR^8)$ groups be OH groups. The $(OR^8)$ groups are lower alkoxy groups having up to 8 carbon atoms, such as methoxy, ethoxy and isopropoxy groups. The presence of such groups on methylsiloxy groups in the resin aids in regulating the cure time of the resin. As the ratio of alkoxy groups to siloxy groups increases the cure time increases.

If desired, fillers and pigments can be added to the uncured molding composition to increase the strength of the cured molding composition, make a more attractive product, etc. The particular pigment or filler employed in the composition of this invention is not critical but fillers which have a catalytic effect in themselves toward the resin of this invention should be avoided. Alkaline fillers in large quantities and strongly acidic fillers should be particularly avoided as should other fillers which exert a catalytic effect on the condensation of the silicone resin. Some inert fillers which are suitable are ground glass, diatomaceous earth, crushed quartz, fumed silica, precipitated silica, magnesium silicate, zirconium silicate, and aluminum silicate. The preferred fillers are zirconium silicate, chopped glass fibers, aluminum oxide and fused silica. The amount of filler present in the resin can vary from 0% up to the point where the filler concentration is so high that it interferes with the flow properties of the molding resin.

The preferred resins for use in the practice of the present invention are those having a silanol (measured as OH) content of 5 to 7% by weight or a silanol content as high as 11%. The method of making such resins is generally set forth in U.S. patent application, Ser. No. 671,574 of Duane F. Merrill, filed Sept. 29, 1967, entitled, "Silanol Containing Organopolysiloxane Resins and a Method for Making Them." In addition, the preferred resins also contain some siloxy groups which are substituted with one methyl radical per siloxy unit and these mono-substituted siloxy units also contain some alkoxy substitution. It is the siloxy units in the resin which are mono-substituted with methyl groups and which also contain some alkoxy substitution which regulate the cure time of the resin.

Silanol-containing organopolysiloxane resins having a silanol content of 5% to 11 or 12% can be made by hydrolyzing organohalosilanes utilizing a water-immiscible organic solvent and acetone as a cosolvent. The method involves agitating a mixture comprising (A) organohalosilane preferably in combination with a lower alkyltrialkoxysilane, (B) water, (C) acetone, (D) a water-immiscible organic solvent, and (E) an aliphatic monohydric alcohol having from 1 to 8 carbon atoms where there is present by weight in said mixture, per part by weight of (A), 1.7 to 10 parts of (B),
0.2 to 5 parts of (C), and
0.3 to 5 parts of (D), and from 0 to 1 mole of (E) per mole of halogen attached to silicon of (A), separating an organic solvent solution of (F) from the resulting hydrolysis mixture, where (F) is a silanol-containing organopolysiloxane having an average ratio of from about 1 to 1.8 organo radicals per silicon atom, and (A) is selected from, (a) organotrihalosilane,
(b) a mixture of organotrihalosilane and diorganodihalosilane,
(c) the reaction product of (E) and a member selected from (a) and (b), which has an average ratio of up to 1 alkoxy radical per halogen radical,
(d) a mixture of (c) and a member selected from (a) or (b), and where the organo radicals of (A) and (F) are attached to silicon by carbon-silicon linkages and are selected from monovalent hydrocarbon radicals, halogenated monovalent hydrocarbon radicals, and cyanoalkyl radicals.

Included by the organohalosilanes which can be employed in the practice of the invention, are silanes of the formula, (1)  $(R^7)_aSiX_{4-a}$ where $R^7$ is as defined previously, X is a halogen radical, such as, chloro, and $a$ is an integer having a value of 1 or 2. In addition, there can be employed in combination with such organohalosilanes of Formula 1, an aliphatic monohydric alcohol of the formula, (2)  $R^8OH$ or an alkoxylated organosilane of the formula, (3)  $(R^7)_a(R^8O)_bSiX_{4-a-b}$ where $R^7$ and $R^8$ are as defined previously, X and $a$ are as defined above; $b$ is an integer equal to 1 to 3, inclusive; and the sum of $a$ and $b$ is equal to 2 to 4, inclusive.

Included by the organohalosilanes of Formula 1 are, for example, methyltrichlorosilane, dimethyldichlorosilane, methylphenyldichlorosilane, phenyltrichlorosilane, diphenyldichlorosilane, etc. Included by the partially alkoxylated organohalosilanes of Formula 3, are reaction products of organohalosilanes of Formula 1, where $R^7$ is preferably selected from the class consisting of monovalent hydrocarbon radicals and halogenated monovalent hydrocarbon radicals, with alcohols of Formula 2 such as, methyl alcohol, ethyl alcohol, propyl alcohol, isopropyl alcohol, butyl alcohol, etc.

In instances where the aliphatic monohydric alcohol of Formula 2 is utilized in the practice of the invention, the alcohol can be added directly to the organohalosilane of Formula 1 before hydrolysis, or it can be added to the hydrolysis mixture prior to the addition of the organosilane. As a result, the silanol-containing organopolysiloxane of the present invention, can be free of or contain chemically combined alkoxy radicals attached to silicon.

The preferred uncured silicone resins of the present invention can have from 4% to 11% and even as high as 12% and preferably from 5% to 7% by weight of hydroxy radicals attached to silicon. These resins are friable, fast-curing molding materials when at 100% solids. Experience has shown that in most instances, the average ratio of the $R^7$ radicals to silicon will determine the nature of the resin and its utility. For example, resins at 100% solids, having an average ratio of about 1 to about 1.2 $R^7$ radicals, per silicon atom a silanol content of from 4% to 11% by weight with or without chemically combined alkoxy radicals, are generally friable and suitable for molding applications. These moldable materials have been found to soften at temperatures as low as 60° C., and generally flow at temperatures between 70° C.–90° C.

In accordance with the method of the invention, hydrolysis is achieved by agitating the organohalosilane in the presence of water, acetone, and organic solvent. The organic layer is separated from the acid layer which forms during hydrolysis. The organic phase then is stripped to produce a 100% solids resin.

Although the order of addition of the various ingredients is not critical, it is preferred to add the organohalosilane to the mixture of water, acetone, and organic solvent. Preferably, a proportion of from 2 to 6 parts of water, 0.3 to 2 parts of acetone, and 0.6 to 2 parts of organic solvent, per part of organohalosilane can be employed. Suitable organic solvents are, for example, any water-immiscible organic solvent which is inert to the hydrolysis reactants during hydrolysis, and in which the hydrolyzate is soluble, to provide for its separation from the aqueous layer. For example, there can be employed a hydrocarbon such as, benzene, toluene, xylene, etc.; esters such as, butyl acetate and ethyl acetate; ethers such as, diethyl ether, dioxane, etc. During the addition, the mixture is agitated to provide for a sufficient degree of hydrolysis of the organohalosilane and formation of the organopolysiloxane hydrolyzate. The temperature of the hydrolysis mixture can be controlled by the rate of addition, or external heat or cooling can be employed if desired. During hydrolysis, a temperature between 25° C. to 85° C. has been found effective, while a temperature between 25° C. to 50° C. is preferred. After the addition has been completed, the mixture can be stirred for an additional period of time, such as, 30 minutes or more to allow for complete hydrolysis of the organohalosilanes. The mixture is then allowed to settle and the acid layer can be drawn off from the organic layer. The organic layer can then be stripped of solvent to 100% solids.

When making molding resins, it has been found expedient to strip under reduced pressure such as a pressure between 25 mm. to 500 mm. Hg to a solids concentration of from 50% to 70% by weight of the resin solution. Resin impurities can be removed at this solids concentration, such as, by filtration, centrifuging, etc. Further stripping can be employed to 100% solids at a temperature sufficient to remove all of the residual solvent. For example, when stripping toluene, a temperature of up to 130° C. has been found effective.

In instances where the average $R^7$ to Si ratio is above 1.2, for example, 1.2 to 1.4 or 1.4 to 1.8, it is preferred to strip at atmospheric pressure to a solids concentration of up to about 95%. If it is desired, the resin can be refluxed 2 to 3 hours at temperatures between 180° C. to 230° C., to further improve the characteristics of the resin.

Of the fillers indicated above, the most preferred are finely divided fumed silica and finely divided precipitated silica. Generally, there is used in the molding composition from 5% to 400% by weight of the total silicone resin present in a filler. More preferably, there is used from 30% to 150% by weight of the total silicone resin present in the molding composition of fumed silica filler or precipitated silica filler which may be treated or untreated. In the past, in order to control the flow properties of the molten uncured molding composition so that it would flow properly into a transfer molding or injection molding equipment, the amount of filler was varied in the molding composition to result in the proper flow properties. In particular, there was used 2 to 15% by weight of the total silica filler present of a disilazane treated filler which disilazane treated filler tended to increase the viscosity and coherency of the molten, uncured molding composition without detracting from its requisite and necessary flow properties. Such disilazane treated filler is, for instance, disclosed in the patent of Brown, U.S. Pat. 3,334,062. In particular, such a disilazane treated filler which is more expensive than the regular untreated fumed silica and untreated precipitated silica and more expensive than the precipitated silica and fumed silica that are treated by normal procedures, can be used in the concentrations indicated above, that is, 2 to 15% by weight of the total finely divided silica present, to control the flow properties of the uncured molding composition during the molding process.

The novel silicone resin of the present case imparts to the resulting molding composition the desired flow properties for transfer molding and other types of molding operations. In order to increase the tensile strength of the molding composition, there is also preferably present 50 to 200% by weight of the total silicone resin present of glass fibers or other types of glass reinforcing materials which are incorporated in the molding resin to give the final molded product increased tensile strength as well as increased flexural strength and toughness.

There may also be incorporated into the molding composition of the present case various release agents such as, calcium stearate, stearyl alcohol and etc., which release agents facilitate the removal of the molded part from the mold. If such a release agent is not used then the molded part tends to stick or adhere to the mold form. Such a release agent may be used at a concentration of 1 to 4% by weight of the total silicone resin present in the molding composition.

There may also be used in the present composition various pigments such as, Sterling 105 which is a black pigment that is preferred in molded parts that are used to encapsulate electronic components. Various heat aging additives may also be used in the composition to increase its heat resistance such as, $Fe_2O_3$ and etc.

In the process for producing the uncured molding composition, it is preferred that the terpolymer novel silicone resin of the present case be first blended with the silica filler, the release agent, the catalyst system and the color pigments in a high speed blade mixer at a speed in the order of 4000 r.p.m. for approximately 4 minutes. After the ingredients are thoroughly mixed, any additional silicone resin can be added at this point such as the silicone resin of Duane identified above in the present specification. The additional silicone resin is added to the mixture and is mixed with the other components at a speed of about 2000 r.p.m. for approximately 2 minutes. Then the glass fibers are added to the already mixed ingredients and the resulting ingredients are mixed at a speed of 2000 r.p.m. for an additional 2 minutes. The uncured molding compound is then formed by transferring the blend from the mixer into a double screw conveyor which feeds a rotor mixer. A temperature in the order of 80 to 100° C. is employed at a rotor speed in neighborhood of 500±100 r.p.m. The output of the rotor mixer which is fluidized by the heat generated in the mixture is fed between two rollers where it is formed into a solid sheet. The sheet is cooled to room temperature and granulated in a grinder to a particle size of approximately 10 mesh. This 10 mesh particle size molding compound can be used, as is in an injection, transfer or compression molding apparatus or can be pelletized before use in some molding apparatus.

The examples given below are meant to illustrate the invention and not to limit or define the scope of the invention or the claims. All parts are by weight.

EXAMPLE 1

There was first made a mixture of 344 parts of methyltrichlorosilane, 491 parts of phenyltrichlorosilane and 43 parts of dimethyldichlorosilane. This mixture was added slowly with rapid stirring through a dip pipe to a water, toluene, acetone mixture containing a diorganopolysiloxane therein. The water mixture comprised 3000 parts of water, 900 parts of toluene, 900 parts of acetone and 122 parts of a silanol chain-stopped diorganopolysiloxane having 100 diorganosiloxy units and containing 95 mole percent dimethylsiloxy units and 5 mole percent diphenyl siloxy units. The starting temperature of the reaction was 27° C., and the chlorosilane mixture was added to the water mixture over a period of 10 minutes. During this addition, the water mixture reached a temperature peak of 73° C. After the addition was completed, the mixture was agitated for 25 minutes and allowed to separate for 20 minutes. The separation of the organic phase from the aqueous phase was made and the organic phase was washed for 5 minutes by agitating with 300 parts of water and then the water phase was separated from the organic phase. This washing procedure was carried out until the organic phase was neutral. Then the organic phase which was again separated from the washing water phase was filtered through a Celite/fuller's earth cake to remove any trace amounts of acid. The filtrate was stripped to 120° C. atmospheric pressure then vacuum stripped to a final temperature of 145° C. at 35 mm. vacuum. The molten resin was cast into a tray, cooled to room temperature and ground to a fine powder. The fine powder when heated on the hot plate had a gel time at 200° C. of 17 minutes, 3 p.p.m. of hydrochloric acid and a silanol content of 5.75% by weight. Its appearance was that of an opaque white powder, free flowing with no tendency to agglomerate on standing. This resin was also very stable in storage. This resin had a R to Si ratio of 1.30 to 1. The final resin also had a ratio of $CH_3SiO_{3/2}$ units and $C_6H_5SiO_{3/2}$ units to

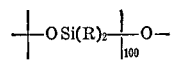

units of 2.8 to 1 and a ratio of $CH_3SiO_{3/2}$ and $C_6H_5SiO_{3/2}$ units to $(CH_3)_2SiO_2$ units of 1.4 to 1. In addition, this resin had a $CH_3SiO_{3/2}$ content of 35 mole percent based on the total units in the resin and there was present in the resin 35 mole percent of phenyl as $C_6H_5SiO_{3/2}$ units in the total resin. This resin which was the novel silicone resin of the present invention was used to produce silicone molding resin compositions of superior properties as illustrated in the additional examples below.

EXAMPLE 2

A silane blend composed of 19.5 moles of methyltriethoxysilane, 28.5 moles of methyltrichlorosilane, 47 moles of phenyltrichlorosilane and 5 moles of dimethyldichlorosilane was hydrolyzed in a mixture of toluene, acetone and water. For every 1000 parts of the silane blend there was used 47 parts of the toluene, acetone mixture. The mixture was composed of 825 parts of toluene, 722 parts of acetone and 3000 parts of water. The hydrolysis was carried out by adding the silane blend to a preheated mixture of the toluene, acetone and water. The silane blend was added over a 25-minute period during which time the temperature of the hydrolysis mixture went from 25° C. to 70° C. After the silane addition had been completed, the hydrolyzate was agitated for 5 minutes. The agitation was stopped and the layers separated very rapidly. As soon as the separation was completed, the resin was transferred to a bodying kettle and vacuum stripped to 40° C. to a solid content of 50° C. The resin which had been formed by the above described hydrolysis processes was then vacuum dried using a continuous film evaporator. When all of the solvent had been removed, the resin was then cast, cooled to room temperature and ground to a fine powder. The resulting resin had an R to Si ratio of 1.65 and a silanol and alkoxy content of 7% by weight.

EXAMPLE 3

There was added into a mixing chamber 242 parts of fumed silica filler, 6 parts of the disilazane treated filler which is fumed silica filler treated according to the method of the Brown patent identified above. Then there was added 4 parts of stearic alcohol, 1.20 parts of pigment, 1.70 parts of lead carbonate and 1.20 parts of benzoic anhydride. The resulting mixture was agitated in a high speed blade mixer at 4000 r.p.m. for four minutes. Then there was added to the ingredients, 180 parts of the resin of Example 2 and 60 parts of the resin of Example 1. The resulting ingredients were mixed at 2000 r.p.m. for two minutes. To the resulting mixture there was then added 292 parts of glass fibers. The ingredients were then mixed at 2000 r.p.m. for 2 minutes. The composition was then milled on a two-roll mill at a temperature of 100° C. for 5 minutes. The resulting composition was cooled to 25° C. and the sheet of uncured molding composition was granulated to form particles of 10 mesh or less. It was found that a sample of this uncured molding composition when placed on a chromium hot plate maintained at 175° C. would start to gel after 32 seconds and would reach its final thermosetting structure after 56 seconds. Then 20 grams of this uncured silicone resin molding composition was heated at 175° C. and tested in an ASTM spiral mold flow equipment tester. It was found that the material travelled 53 inches before it stopped flowing. Then two samples of the uncured molding composition granules were taken and there were molded one sample at ½ minute and one sample at 2½ minutes at 175° C. and 1000 p.s.i. to produce two 6″ x 6″ x 1/16th″ test specimens. The molded samples as removed from the hot mold were rigid, unblistered and free of any voids. The samples had the following properties:

Hardness Shore D—2½ minutes: 74
Hardness Shore D—1½ minutes: 56

The sample was then taken and placed in a pressure cooker maintained at 300° F. for 4 hours. At the end of that time, it was found that the sample only increased in weight 0.20% by weight. This last test indicated the superior moisture resistance of the compound.

The sample was then taken and repeatedly cooled from a temperature of 175° C. to 0° C. in less than 10 seconds. One such cooling act constituted one cycle. The sample of the present invention underwent 5 cycles of this type of cooling before crazing appeared on the surface of the sample. A sample was also prepared from an uncured molding composition which uncured molding composition was prepared using the same ingredients as indicated above in this example with the exception that the total silicone resin present constituted 240 parts of the resin of Example 2, and no resin of the type of Example 1 was present in the composition.

This molded sample which shall be referred to as the "Control" cracked after one cooling cycle in the above test, thus, indicating that the superior thermal resistance of the compounds of molding compositions containing the novel silicone resin of the present invention.

EXAMPLE 4

To a mixing chamber there was added 292 parts of fumed silica filler, 6 parts of a disilazane treated filler, 4.0 parts of stearic alcohol, 1.20 parts of pigment, 2.4 parts of lead carbonate, and 1.20 parts of benzoic anhydride. The resulting mixture which was placed in a high speed blade mixer was agitated for 4 minutes at a speed of 4000 r.p.m. At the end of that time there was added to the ingredients 120 parts of the resin of Example 2 and 120 parts of the resin of Example 1. The resulting mixture was agitated for 2 minutes at 2000 r.p.m. To this mixture then there was added 292 parts of glass fibers and the resulting ingredients were mixed in a high speed blade mixer for 2 minutes at 2000 r.p.m.

The resulting composition was then milled on a two-roll mill at a temperature of 100° C. for 5 minutes and the sheet that was formed was cooled to 25° C. and granulated to particles of a size of 10 mesh or less. A sample of this uncured silicone resin molding composition was then placed on a hot plate, maintained at 175° C., and it was found that the material started to gel after 27 seconds and reached its final thermosetting structure after 38 seconds.

A sample of this uncured molding composition was also put through the ASTM spiral flow test and it was found that the molding composition after it had been heated to 175° C. flowed 45 inches before it stopped flowing in such ASTM spiral flow test.

Two samples of the uncured molding composition were then molded one for ½ minute and the other for 2½ minutes at 175° C. and 1000 p.s.i. to produce two 6" x 6" x ⅟₁₆th" test specimens. The molded samples as removed from the hot mold were rigid, unblistered and free of any voids. The samples had the following properties:

Hardness Shore D—2½ minutes: 71
Hardness Shore D—1½ minutes: 54

The sample that was cured for 2½ minutes was then taken and placed in a pressure cooker maintained at 300° F. for a period of four hours. At the end of that four hour period it was found that the sample had only increased in weight by 0.21% by weight, thus, illustrating the superior moisture resistance of the molding compositions utilizing the silicone resin of the present invention.

The sample that was molded for 2½ minutes was also tested in accordance with the thermal shock resistance test of Example 3. It was found that the sample was able to be cooled through 14 cycles before it crazed.

EXAMPLE 5

There was added to a mixing chamber 73 parts of fumed silica filler, 1.5 parts of disilazane treated filler, 1.0 part of stearic alcohol, 0.30 part of pigment, 0.22 part of lead carbonate, and 0.30 part of benzoic anhydride. The resulting ingredients were mixed in a high speed blade mixer at 4000 r.p.m. for 4 minutes. At the end of that time there was added to the ingredients 30 parts of the resin of Example 2, 30 parts of the resin of Example 1. The resulting ingredients were then mixed at 2000 r.p.m. for 2 minutes. To these ingredients there was then added 73 parts of glass fibers. These ingredients were then mixed at 2000 r.p.m. for 2 minutes to uniformly disperse all the ingredients in the composition. The composition was then milled on a two-roll mill at a temperature of 100° C. for 5 minutes. The sheet that was formed was then cooled to 25° C. and granulated into particles of the size of 10 mesh or less.

A sample of this uncured molding composition was taken and placed on a hotplate maintained at 175° C. It was found that the molding composition gelled after 26 seconds and reached its thermosetting consistency after 34 seconds. Two samples of the uncured molding composition granules were then taken and molded for 1½ minutes at 175° C. and 1000 p.s.i. to produce a 6" x 6" x ⅟₁₆th" test specimen and the other sample was molded for 2½ minutes at 175° C. and 1000 p.s.i. to produce a 6" x 6" x ⅟₁₆th" test specimen. The molded samples as removed from the hot mold were rigid, unblistered and free of any voids. These molded samples have the following properties:

Hardness Shore D—2½ minutes: 65–70
Hardness Shore D—1½ minutes: 60–65

The sample that was molded for 2½ minutes was then taken and placed in a pressure cooker maintained at 300° F. for 4 hours. After it was removed from the pressure cooker, it was found that it increased in weight by 0.19% by weight, thus, illustrating the superior moisture resistance of silicone molding compositions containing the novel silicone resin of the present case. The sample that was molded at 2½ minutes was also tested in accordance with the thermal shock resistance test of Example 3. It was found that the sample underwent 15 cycles of cooling from the temperature of 175° C. to 0° C. before it crazed, thus, proving the superior thermal shock resistance of the molding compositions of the present invention.

EXAMPLE 6

There is first made a mixture of 183 parts of methyltrichlorosilane, 587 parts of phenyltrichlorosilane, 40 parts of of dimethyldichlorosilane and 77 parts of diphenyldichlorosilane. This mixture is added slowly with rapid stirring through a dip pipe to a water, toluene, acetone mixture containing a diorganopolysiloxane therein. The water mixture comprises 3000 parts of water, 900 parts of toluene, 900 parts of acetone and 113 parts of a silanol chain-stopped diorganopolysilofane having 30 diorganosiloxy units and containing 95 mole percent dimethylsiloxy units and 5 mole percent diphenylsiloxy units. The starting temperature of the reaction is 25° C. and the chlorosilane mixture is added to the water mixture over a period of 15 minutes. During this addition, the water mixture reaches a temperature of 73° C. After the addition is completed, the mixture is agitated for 25 minutes and is allowed to separate for 20 minutes. The separation of the organic phase from the aqueous phase is made and the organic phase is agitated and worked for 5 minutes by agitating with 400 parts of water and then the water phase is separated from the organic phase. This washing procedure is carried out until the organic phase is neutral. Then the organic phase which is again separated from the washing water is filtered through a Celite/fuller's earth cake to remove any trace amounts of acid.

The filtrate is stripped to 120° C. atmospheric pressure then vacuum stripped to a final temperature of 145° C. at 35 mm. vacuum. The molten resin is cast into a tray, cooled to room temperature and ground to a fine powder. The fine powder when heated on the hotplate had a gel time at 200° C. of 20 minutes; 3 p.p.m. of hydrochloric acid; and a silanol content of 5.75% by weight. The resin's appearance is that of an opaque white powder, free flowing with no tendency to agglomerate on standing. This resin is also very stable in storage. This resin has an R to Si ratio of 1.17 to 1. The final resin also had a ratio of $CH_3SiO_{3/2}$ units and $C_6SiO_{3/2}$ units to

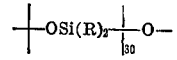

units of 2.6 to 1 and a ratio of $CH_3SiO_{3/2}$ units and $C_6H_5SiO_{3/2}$ units to $(CH_3)_2SiO$ units of 1.3 to 1 and a ratio of $CH_3SiO_{3/2}$ units and $C_6H_5SiO_{3/2}$ units to

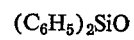

units of 1.3 to 1. In addition, this resin had a $CH_3SiO_{3/2}$ content of 20 mole percent based on the total units in the resin and there was present in the resin 45 mole percent of phenyl as $C_6H_5SiO_{3/2}$ units in the total resin. This resin which is one of the novel silicone resins of the present invention is used to produce silicone molding resin compositions of superior properties.

A critical aspect of the novel silicone resins of the present invention is that at least 12 mole percent of the total resin is comprised of $RSiO_{3/2}$ units where R is selected from lower alkyl radicals of 1 to 8 carbon atoms and preferably is a methyl radical. A resin having this necessary amount of lower alkyl $SiO_{3/2}$ units present, is the silicone resins of Example 1 and Example 6. The reason for having at least this mole percent concentration of lower alkyl trifunctional units is that it results in the resin having the optinum combination of rigidity and tensile strength along with the proper flexural strength and thermal shock resistance properties.

Although silicone resins can be made with a concentration of lower alkyl trifunctional units of less than 12 mole percent of the total novel silicone resin, such resins do not provide in a molding composition the optimum combination of desired physical and chemical properties that is obtained by the novel silicone resins of the present case.

What is claimed is:

1. A silicone resin composition having improved flexural strength and thermal shock resistance comprising (a) a resinous terpolymer compound of $RSiO_{3/2}$ trifunctional units, $R_2SiO$ difunctional units and

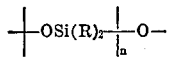

fluid difunctional units, weher the R to Si ratio is 1.05 to 1.99, the mole ratio of the trifunctional units to the difunctional units may vary from 90:1 to 2:1 and the mole ratio of the trifunctional units to difunctional fluid units may vary from 18:1 to .67:1; the total alkoxy and silanol content of the resin may vary from 2% to 8% by weight and where R is selected from the class consisting of lower alkyl radicals of 1 to 8 carbon atoms, cycloalkyl radicals of 5 to 7 carbon atoms, lower alkenyl radicals of 2 to 8 carbon atoms, mononuclear aryl radicals, mononuclear aryl lower alkyl radicals where the alkyl group has from 1 to 6 carbon atoms and halogenated derivatives of the above radicals, where the R radical on each unit may represent different radicals in the same unit, where at least 10 mole percent of the R radicals in the trifunctional units and difunctional units are aryl radicals, and in which at least 12 mole percent based on the total resin of the total quantity of trifunctional units are substituted solely by lower alkyl radicals, $n$ varies from 5 to 1000.

2. The silicone resin of claim 1 wherein at least 12 mole percent based on the total resin of the total quantity of trifunctional units are substituted solely by methyl radicals.

3. The silicone resin of claim 2 wherein the R radicals in the trifunctional units, difunctional units and difunctional fluid units are selected from the class consisting of methyl and phenyl.

4. The silicone resin of claim 1 wherein the R to Si ratio is from 1.2 to 1.6.

5. The silicone resin of claim 1 wherein the mole ratio of the trifunctional units to the difunctional units is from 18:1 to 2:1.

6. The silicone resin of claim 1 wherein the mole ratio of the trifunctional units of the fluid difunctional units is from 9:1 to 1:1.

7. A process for producing a silicone resin having exceptional flexural strength, thermal shock resistance and moisture resistance comprising (a) mixing a mixture of organohalogensilanes of the formula, $$R_aSiX_{4-a}$$

with water, acetone, a water-immisicible solvent, and a silanol-stopped diorganopolysiloxane having a viscosity of 1 to 100,000 centipoises at 25° C., where the R radicals and the organo radicals of the diorganopolysiloxane are selected from the class consisting of lower alkyl radicals of 1 to 8 carbon atoms, cycloalkyl radicals of 5 to 7 carbon atoms, alkenyl radicals of 2 to 8 carbon atoms, mononuclear aryl radicals, mononuclear aryl lower alkyl radicals, where the alkyl group has 1 to 6 carbon atoms, and halogenated derivatives thereof; $a$ varies from 1 to 2 and X is halogen; (b) agitating the mixture; (c) separating the organic layer from the water layer; (d) washing the organic layer with water until it is neutral; (e) filtering the organic layer; (f) stripping of the solvent from the organic layer at a temperature in excess of 100° C. to leave a resinous material; (g) casting the molten resinous material at a 100% solids; and (h) grinding the cast resinous material to a fine powder.

8. The process of claim 7 wherein there is present in step (a), per part of the organohalogensilanes, 1.7 to 10 parts of water, 0.2 to 5 parts of acetone and 0.3 to 5 parts of the water-immiscible solvent and the mixing is carried out at 25° C. to 85° C.

9. The process of claim 7 wherein the step (a), there is also present aliphatic anhydric alcohol of the formula, $$R'OH$$

where R' is selected from alkyl radicals of 1 to 15 carbon atoms.

10. The process of claim 9 wherein in step (a), there is also present alkoxylated organosilanes of the formula, $$(R^2)_a(R'O)_bSiX_{4-a-b}$$

where $R^2$ is selected from the same radicals as R, R', X and $a$ are as previously defined, $b$ is an integer equal to 1 to 4, inclusive; and the sum of $a$ and $b$ is equal to 2 to 4, inclusive.

11. The process of claim 7 wherein the water-immiscible solvent is selected from the group consisting of benzene, toluene, xylene, butyl acetate, ethyl acetate, tetrahydrafuran, diethyl ether, dioxane, heptane and octene.

12. The process of claim 7 wherein the diorganopolysiloxane has the formula,

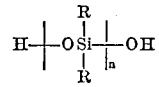

where R is as previously defined and $n$ varies from 5 to 1000.

13. The process of claim 7 wherein $n$ varies from 10 to 200 and wherein there is present per mole of the diorganopolysiloxane, 19 moles to .67 mole of the organohalogensilanes.

14. A molding composition having improved flexural strength, thermal shock resistance and moisture resistance comprising (a) a terpolymer silicone resin comprising $RSiO_{3/2}$ trifunctional units, $R_2SiO$ difunctional units and

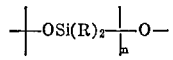

fluid difunctional units where the R to Si ratio is 1.05 to 1.99, the mole ratio of the trifunctional units to the difunctional units may vary from 90:1 to 2:1 and the mole ratio of the difunctional units to the fluid difunctional units may vary from 18:1 to 0.67:1; the total alkoxy and silanol content of the resin may vary from 2% to 8% by weight and where R is selected from the class consisting of lower alkyl radicals of 1 to 8 carbon atoms, cycloalkyl radicals of 5 to 7 carbon atoms, lower alkenyl radicals of 2 to 8 carbon atoms, mononuclear aryl radicals, mononuclear aryl lower alkyl radicals where the alkyl group has from 1 to 6 carbon atoms, and halogenated derivatives of the above radicals where the R radical in each unit may represent different radicals in the same unit, where at least 10 mole percent of the R radicals in the trifunctional units and the difunctional units are aryl radicals and in which at least 12 mole percent of the total quantity of trifunctional units based on the total units in the resin are substituted solely by lower alkyl groups; $n$ varies from 5 to 1000 (b) a filler, and (c) 0.01 to 6% by weight of the total silicone resin of a catalyst system.

15. The molding composition of claim 14 wherein at least 12 mole percent based on the total resin of the trifunctional units are substituted solely by methyl radicals.

16. The molding composition of claim 15 wherein the R radicals in the trifunctional units, difunctional units and difunctional fluid units are selected from the class consisting of methyl and phenyl.

17. The molding composition of claim 14 wherein the R to Si ratio is from 1.2 to 1.6.

18. The molding composition of claim 14 wherein the mole ratio of the trifunctional units to the difunctional units is from 18:1 to 2:1.

19. The molding composition of claim 18 wherein the mole ratio of the trifunctional units to the fluid difunctional units is from 9:1 to 1:1.

20. The molding composition of claim 14 wherein the terpolymeric silicone resin of the above claim comprises 5 to 100% by weight of the total silicone resin in the molding composition and there is present 0 to 95% by weight of the total silicone resin of a resinous copolymer having the formula,

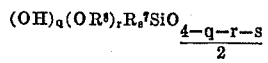

where $R^7$ is defined the same as R, $OR^8$ is selected from lower alkoxy radicals containing from 1 to 8 carbon atoms per radical; $q$ has a value of 0 to 1.0; $r$ has a value of 0 to 1.0; $s$ has a value of 1.0 to 1.7; the sum of $q+r$ has a value of 0.01 to 1.0 and the total alkoxy and silanol content of the resin ranges from 4 to 11% by weight.

21. The molding composition of claim 20 wherein the catalyst system comprises a lead compound selected from the class consisting of $2PbCO_3 \cdot Pb(OH)_2$, $PbCO_3$, $Pb_2O_3$, $Pb_3O_4$, and $PbO_2$.

22. The molding composition of claim 20 wherein the catalyst system comprises a combination of carboxylic acid anhydride and a lead compound selected from the class consisting of $2PbCO_3 \cdot Pb(OH)_2$, $PbCO_3$, $Pb_2O_3$, $Pb_3O_4$ and $PbO_2$ wherein there is present at least 0.25 mole of the anhydride per mole of the lead compound.

23. The molding composition of claim 20 which contains 5 to 400% by weight of the total silicone resin of filler which filler is selected from the class consisting of fumed silica, ground fused silica, precipitated silica, disilazane treated fumed silica, disilazane treated precipitated silica and glass fibers.

24. The molding composition of claim 20 which in addition contains 0.5 to 12% by weight of the total silicone resin of a process aid.

25. The molding composition of claim 20 which contains in addition a release agent and a pigment.

26. A process for forming an uncured silicone resin molding composition which when cured has improved flexural strength, improved thermal shock resistance and improved moisture resistance comprising (a) mixing a terpolymeric silicone resin which comprises 5 to 100% by weight of the total silicone resin content and comprising $RSiO_{3/2}$ trifunctional units, $R_2SiO$ difunctional units and

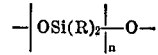

fluid difunctional units in which the R to Si ratio is 1.05 to 1.99, the mole ratio of the trifunctional units to the difunctional units may vary from 90:1 to 2:1 and the mole ratio of the trifunctional units to the fluid difunctional units may vary from 18:1 to 0.67:1; the total alkoxy and silanol content of the resin may vary from 2% to 8% by weight and where R is selected from the class consisting of lower alkyl radicals of 1 to 8 carbon atoms, cycloalkyl radicals of 5 to 7 carbon atoms, lower alkenyl radicals of 2 to 8 carbon atoms, mononuclear aryl radicals, mononuclear aryl lower alkyl radicals where the alkyl group has from 1 to 6 carbon atoms, and halogenated derivatives of the above radicals where the R radical in each unit may represent different radicals in the same unit, where at least 10 mole percent of the R radicals in the trifunctional unit and the difunctional unit are aryl radicals and in which at least 12 mole percent based on the total resin of the total quantity of trifunctional units are substituted solely by lower alkyl radicals, $n$ varies from 5 to 1000 with a filler selected from the class consisting of fumed silica, ground fused silica, precipitated silica and disilazane treated fumed silica; (b) agitating into the mixture the catalyst system, a release agent and a pigment; (c) mixing into the resulting ingredients 0 to 95% by weight of the total resin present of a resinous copolymer having the formula,

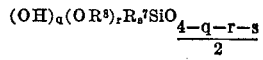

where $R^7$ is the same as R, $OR^8$ is selected from lower alkoxy radicals containing from 1 to 8 carbon atoms per radical; $q$ has a value of 0 to 1.0; $r$ has a value of 0 to 1.0; $s$ has a value of 1.0 to 1.7; the sum of $q+r$ has a value of 0.01 to 1.0 and the total alkoxy and silanol content of the resin ranges from 4% to 11% by weight; (d) adding to the above ingredients glass fibers and agitating the resulting mixture; (e) heating the resulting mixture to above 100° C.; (f) forming the mixture into a sheet; and (g) grind the sheets into granular form for use as an uncured molding resin mixture.

References Cited
UNITED STATES PATENTS 3,328,481    6/1967    Vincent _____ 260—824 X LEWIS T. JACOBS, Primary Examiner U.S. Cl. X.R.

260—824